United States Patent
Yang et al.

(10) Patent No.: US 10,899,629 B2
(45) Date of Patent: Jan. 26, 2021

(54) METHOD FOR PRODUCING STANNOUS SULFIDE

(71) Applicant: Kunming Diboo Technology Co., Ltd., Kunming (CN)

(72) Inventors: Bin Yang, Kunming (CN); Weiping Dai, Kunming (CN); Wei Chen, Kunming (CN); Long Han, Kunming (CN); Hao Chen, Kunming (CN); Kun Yang, Kunming (CN); Hui Xie, Kunming (CN); Shouyun Yang, Kunming (CN); Chunyang Zheng, Kunming (CN); Bin Su, Kunming (CN); Dan Shao, Kunming (CN)

(73) Assignee: KUNMING DIBOO TECHNOLOGY CO., LTD., Kunming (CN)

( * ) Notice: Subject to any disclaimer, the term of this patent is extended or adjusted under 35 U.S.C. 154(b) by 0 days.

(21) Appl. No.: 16/810,887

(22) Filed: Mar. 6, 2020

(65) Prior Publication Data

US 2020/0207636 A1   Jul. 2, 2020

Related U.S. Application Data

(63) Continuation-in-part of application No. PCT/CN2018/074485, filed on Jan. 29, 2018.

(30) Foreign Application Priority Data

Sep. 7, 2017   (CN) .......................... 2017 1 0802843

(51) Int. Cl.
  *C01G 19/00*   (2006.01)

(52) U.S. Cl.
  CPC .......... *C01G 19/00* (2013.01); *C01P 2002/72* (2013.01); *C01P 2006/80* (2013.01)

(58) Field of Classification Search
  CPC ...... C01B 17/20; C01G 19/00; C01P 2006/80
  See application file for complete search history.

(56) References Cited

U.S. PATENT DOCUMENTS

| | | | | |
|---|---|---|---|---|
| 3,642,464 A | * | 2/1972 | Dorenfeld | C01G 19/00 423/89 |
| 5,894,016 A | * | 4/1999 | Fister | C01G 19/00 423/511 |
| 6,187,281 B1 | * | 2/2001 | Guhl | C01G 19/00 423/561.1 |

FOREIGN PATENT DOCUMENTS

| | | | | |
|---|---|---|---|---|
| CN | 106219596 A | * | 12/2016 | ............. C01G 19/00 |
| EP | 0 806 396 A1 | * | 11/1997 | ............... C01G 1/12 |
| JP | 10053414 A | * | 2/1998 | ............... C01G 1/12 |

* cited by examiner

*Primary Examiner* — Timothy C Vanoy
(74) *Attorney, Agent, or Firm* — Matthias Scholl P.C.; Matthias Scholl

(57) ABSTRACT

A method for producing stannous sulfide, the method including: 1) heating a tin-containing material to 200-600° C., and mixing sulfur with the tin-containing material heated, to yield a product; and 2) distilling the product in a vacuum furnace at a pressure of 1-500 pascal.

5 Claims, 2 Drawing Sheets

METHOD FOR PRODUCING STANNOUS SULFIDE

CROSS-REFERENCE TO RELATED APPLICATIONS

This application is a continuation-in-part of International Patent Application No. PCT/CN2018/074485 with an international filing date of Jan. 29, 2018, designating the United States, now pending, and further claims priority benefits to Chinese Patent Application No. 201710802843.7 filed Sep. 7, 2017. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to a method for producing stannous sulfide, also known as tin (II) sulfide. The chemical formula of stannous sulfide is SnS. Its natural occurrence concerns herzenbergite (α-SnS), a rare mineral.

SUMMARY

The disclosure provides a method for producing stannous sulfide.

The method for producing stannous sulfide comprises 1) heating a tin-containing material to 200-600° C., and mixing sulfur with the tin-containing material heated, to yield a product; and 2) distilling the product in a vacuum furnace at a pressure of 1-500 pascal.

The tin-containing material is refined tin or crude tin comprising tin and impurities selected from copper, iron, nickel, or a mixture thereof.

The mass ratio of the sulfur to the tin-containing material is 1.1-1.5.

The sulfur is mixed with the tin-containing material for 5-30 min.

The vacuum furnace has a temperature of 900-1350° C.

In this disclosure, the tin-containing material is sulfurized and the metal tin is converted into sulfides, with the following chemical reactions: $Sn+S=SnS$, $Sn+2S=SnS_2$; thus, the products obtained after the reactions may contain one or more of Sn, SnS, $SnS_2$ and S. The type of the products is subject to the addition amount of the sulfur. Based on the tin amount of the refined tin, the theoretical amount of sulfur was calculated to fulfill the complete reaction of tin and sulfur. When excess sulfur is added, tin disulfide is produced, and the products after sulfurization are tin disulfide and sulfur; when the amount of sulfur added is insufficient, part of tin reacts with sulfur to generate stannous sulfide, some of which fail to react and still exist in the metal state, and the product after sulfurization is metal tin and stannous sulfide.

Based on the difference of saturated vapor pressure of metals and sulfides, the vacuum distillation is used to separate and purify sulfides, so as to produce high purity stannous sulfide.

The relations of the saturated vapor pressure (P) and temperature (T) of Sn, SnS and S are as follows: $\lg P_{Sn}^* = -15500T^{-1}+10.355$ (Pa);

$\lg P_{SnS}^* = -10601T^{-1}+12.27$ (Pa); $\ln P_S^* = 89.273 - 13463T^{-1} - 8.9643 \ln T$ (Pa).

Under the distillation temperature of the disclosure, the saturated vapor pressure of SnS and S is much higher than that of Sn, and SnS first volatizes during distillation, so the metal and sulfide can be separated by vacuum distillation. There are three kinds of tin-containing sulfides: SnS, $SnS_2$ and $Sn_2S_3$. At a certain temperature, the three substances change as follows:

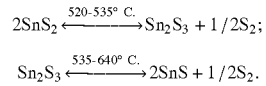

$$2SnS_2 \xrightleftharpoons{520\text{-}535°\text{ C.}} Sn_2S_3 + 1/2S_2;$$

$$Sn_2S_3 \xrightleftharpoons{535\text{-}640°\text{ C.}} 2SnS + 1/2S_2.$$

Thus, SnS is a stable tin-containing sulfide. No matter what the composition of the sulfurized product is, the volatiles obtained after vacuum distillation are all stannous sulfide. Through vacuum distillation, the quality of stannous sulfide is improved, and high purity stannous sulfide can be obtained.

Compared with conventional preparation process, in this disclosure, the sulfuration reaction speed of tin containing materials is fast, so the reaction time is short, so that the preparation time of stannous sulfide is shortened, and the production efficiency is improved.

In addition, the method for producing stannous sulfide produces no waste residue and waste gas, so it is environmentally friendly.

DETAILED DESCRIPTION OF THE EMBODIMENTS

To further illustrate, embodiments detailing a method for producing stannous sulfide are described below. It should be noted that the following embodiments are intended to describe and not to limit the disclosure.

Example 1

3N refined tin was heated to 320° C. where the refined tin was in the molten state. Based on the tin amount of the refined tin, the theoretical amount of sulfur was calculated to fulfill the complete reaction of tin and sulfur. 0.8 times the theoretical amount of sulfur was mixed with the refined tin and stirred, thereby producing a reaction product.

The reaction product was distilled in a vacuum furnace having a temperature of 1150° C. and a pressure of 25 pascal for 1.5 hours.

Chemical detection results showed the volatile substance resulting from the vacuum distillation was stannous sulfide comprising 78.76% by weight of tin, 20.7% by weight of sulfur, and less than 0.5% by weight of impurities such as lead (Pb), antimony (Sb), cadmium (Cd).

Figure 1:
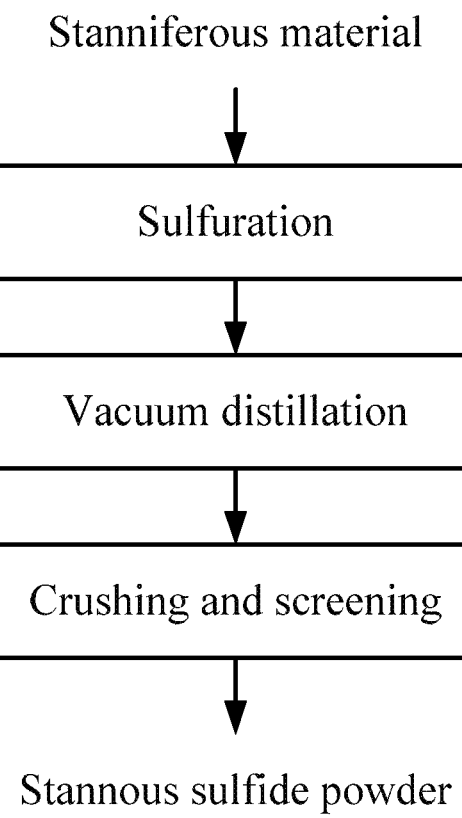
FIG. 1 is a flow chart of a method for producing stannous sulfide according to one embodiment of the disclosure.
Figure 2:
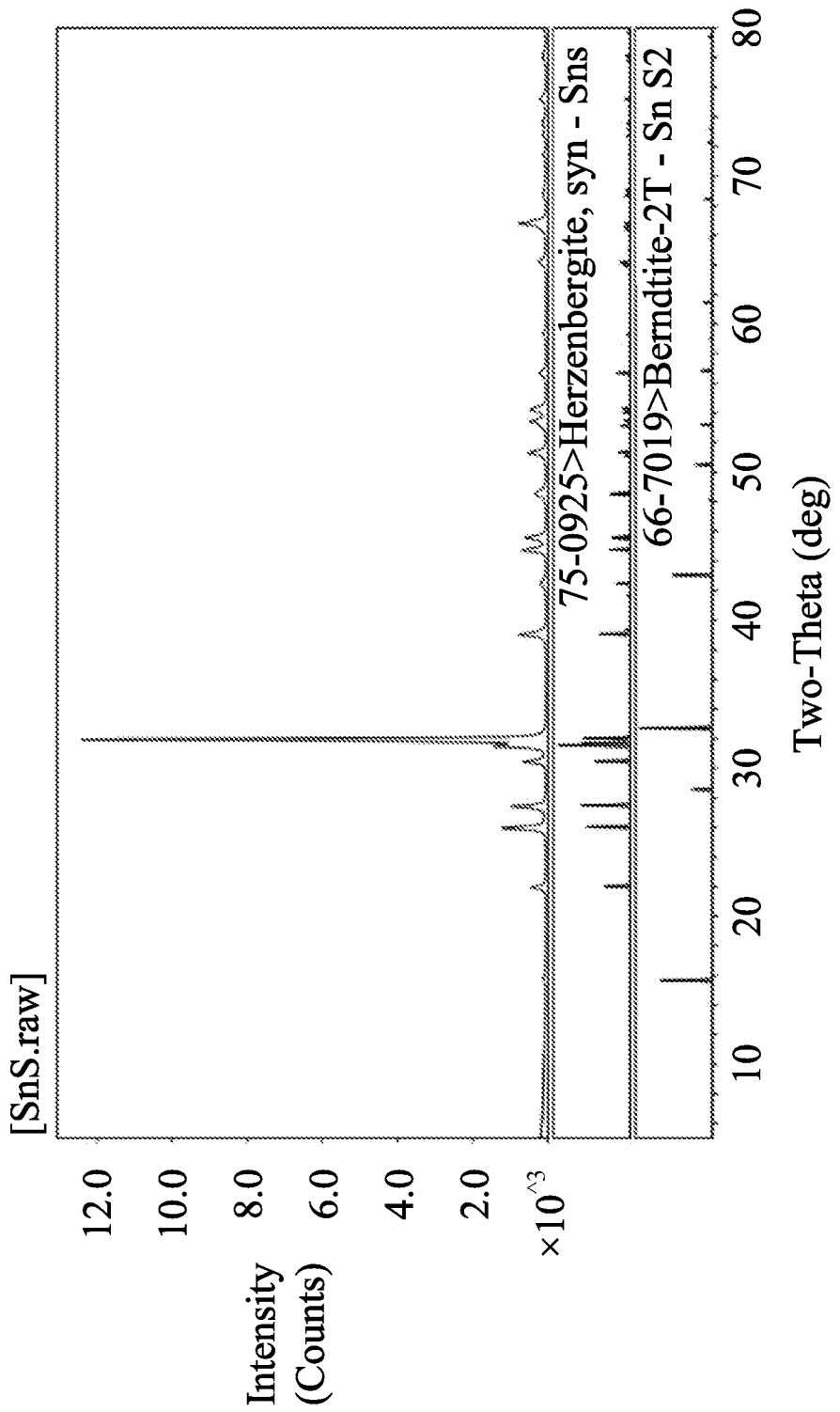
FIG. 2 is an X-Ray diffraction spectrum of stannous sulfide prepared according to the method of the disclosure.

FIG. 2 is the X-Ray diffraction spectrum of the prepared stannous sulfide. According to the percent composition by mass, the content of tin in stannous sulfide is 119/(119+31)×100%=78.8%, so the purity of the tin in the stannous sulfide is calculated as 78.76%/78.8%=99.95%.

Example 2

A copper-tin alloy was heated to 450° C. where the refined tin was in the molten state. Based on the tin amount of the refined tin, the theoretical amount of sulfur was calculated to fulfill the complete reaction of tin and sulfur. 1.2 times the theoretical amount of sulfur was mixed with the copper-tin alloy and stirred, thereby producing a reaction product.

The reaction product was distilled in a vacuum furnace having a temperature of 1350° C. and a pressure of 40 pascal for 2 hours.

Chemical detection results showed the volatile substance resulting from the vacuum distillation was stannous sulfide comprising 78.65% by weight of tin, 20.95% by weight of sulfur, and less than 0.4% by weight of impurities such as lead (Pb), antimony (Sb), cadmium (Cd). FIG. 2 is the X-Ray diffraction spectrum of the prepared stannous sulfide. According to the theoretical calculation, the content of tin in stannous sulfide is 119/(119+31)×100%=78.8%, so the purity of the tin in the stannous sulfide is calculated as 78.65%/78.8%=99.81%.

Example 3

3N tin powers were heated to 370° C. where the refined tin was in the molten state. Based on the tin amount of the refined tin, the theoretical amount of sulfur was calculated to fulfill the complete reaction of tin and sulfur. The theoretical amount of sulfur was mixed with the refined tin and stirred, thereby producing a reaction product.

The reaction product was distilled in a vacuum furnace having a temperature of 1050° C. and a pressure of 60 pascal for 2 hours.

Chemical detection results showed the volatile substance resulting from the vacuum distillation was stannous sulfide comprising 78.795% by weight of tin, 21.17% by weight of sulfur, and less than 0.04% by weight of impurities such as lead (Pb), antimony (Sb), cadmium (Cd). FIG. 2 is the X-Ray diffraction spectrum of the prepared stannous sulfide. According to the theoretical calculation, the content of tin in stannous sulfide is 119/(119+31)×100%=78.8%, so the purity of the tin in the stannous sulfide is calculated as 78.795%/78.8%=99.994%.

It will be obvious to those skilled in the art that changes and modifications may be made, and therefore, the aim in the appended claims is to cover all such changes and modifications.

What is claimed is:

1. A method, comprising:
1) heating a tin-containing material to 200-600° C., and mixing sulfur with the tin-containing material heated, to yield a product; and
2) distilling the product in a vacuum furnace at a pressure of 1-500 pascal.

2. The method of claim 1, wherein the tin-containing material is refined tin or crude tin comprising tin and impurities selected from copper, iron, nickel, or a mixture thereof.

3. The method of claim 1, wherein in 1), a mass ratio of the sulfur to the tin-containing material is 1.1-1.5.

4. The method of claim 1, wherein in 1), the sulfur is mixed with the tin-containing material for 5-30 min.

5. The method of claim 1, wherein the vacuum furnace has a temperature of 900-1350° C.

* * * * *